United States Patent [19]

Kostrukoff

[11] 4,020,450
[45] Apr. 26, 1977

[54] TOWED HYDROPHONE PREAMPLIFIER AND RECEIVER

[75] Inventor: Serge Kostrukoff, San Diego, Calif.

[73] Assignee: The United States of America as represented by the Secretary of the Navy, Washington, D.C.

[22] Filed: Jan. 5, 1976

[21] Appl. No.: 646,810

[52] U.S. Cl. .................. 340/15.5 GC; 330/28; 330/35; 340/3 T; 340/7 R; 340/15.5 TS; 340/10

[51] Int. Cl.² ............... G01V 1/18; G01V 1/38

[58] Field of Search .......... 340/7 R, 17 R, 15.5 TS, 340/15.5 GC, 3 T, 10; 333/8; 330/28, 35

[56] References Cited

UNITED STATES PATENTS

| | | | |
|---|---|---|---|
| 3,255,419 | 6/1966 | Knapton et al. | 330/28 |
| 3,452,287 | 6/1969 | Busch et al. | 330/35 |
| 3,454,891 | 7/1969 | Siegel | 330/35 |
| 3,913,024 | 10/1975 | Necoechea | 330/28 |
| 3,939,466 | 2/1976 | Horwath | 340/7 R |
| 3,939,468 | 2/1976 | Mastin | 340/7 R |
| 3,953,807 | 4/1976 | Schade, Jr. | 330/35 |

Primary Examiner—Howard A. Birmiel
Attorney, Agent, or Firm—Richard S. Sciascia; Ervin F. Johnston; Thomas Glenn Keough

[57] ABSTRACT

A hydrophone and preamplifier are coupled to receive signals representative of impinging acoustic energy. At the other end of a long length of two conductor coaxial cable, a receiver section provides representative voltage signals for following processing circuitry. DC power is fed to the preamp section along the single cable which also transmits the information current signals back to the receiver. The receiver section is designed to present a very low input impedance to enable the swamping out of the capacitive reactance introduced by the long cable. This allows the use of a long coaxial towing cable without introducing any appreciable frequency response degradation. Suitable electronic interconnection ensures that the preamplifier output signal is not affected by the supply voltage back at the receiver section and moderate potential variations between the cable ends do not introduce spurious noise components.

1 Claim, 1 Drawing Figure

U.S. Patent    April 26, 1977    4,020,450
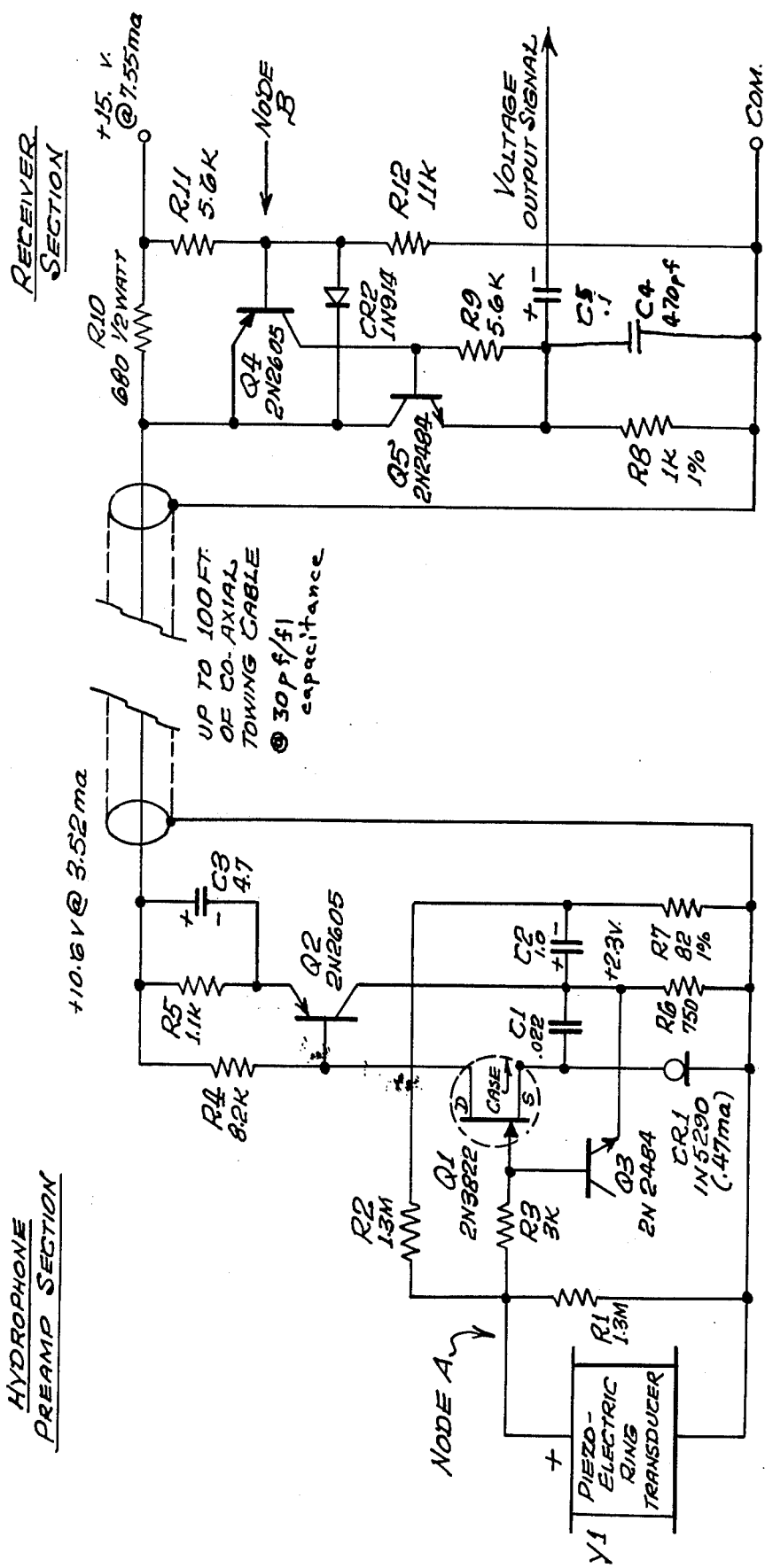

TOWED HYDROPHONE PREAMPLIFIER AND RECEIVER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Towed hydrophones for both scientific and military applications have been in use for some time. Certain parameters, for example the required target size of an active sonar echo repeater, can dictate that the hydrophone be separated a considerable distance from the transmitter in order to prevent acoustic feedback oscillation. Separation of the transmitter from the hydrophone conventionally is established by towing the hydrophone with a cable. A long towing cable usually means that some sort of a preamplifier stage need be provided at the hydrophone to facilitate the transmission of the received signals back to processing circuitry onboard the towing vehicle. Additional conductors, therefore, had to be included in the towing cable to feed power to the preamplifier stage and elaborate shielding was needed among the conductors. These modifications of the towing cable not only increased its bulk and per unit cost, but introduced capacitive reactance components which tended to degrade the transmitted signals originating from the hydrophone. Another undesirable trait of the multiconductor towing cables became apparent when the cable was pinched or otherwise damaged. This, on occasion, would short the power supply and disable other system functions. In addition, some of the conventional preamplifiers alter the character of the signals received from the transducer. Thus, there is a continuing need in the state-of-the-art for hydrophone preamplifier-receiver sections suitable for interconnection to a single conductor coaxial cable which ensures the transfer of representative signals to following electronic processing circuits.

SUMMARY OF THE INVENTION

The present invention is directed to providing a circuit for transmitting signals generated by a transducer representative of impinging acoustic energy. An amplifying means is coupled to receive the signals from the transducer for processing these signals into modulated current components. A two conductor coaxial cable of substantial length functions to transmit power to the amplifying means and to couple the representative signals to a following means which converts the modulated current signal components into voltage signals not affected by the reactive components of the long cable.

It is an object of the invention to provide an improved hydrophone preamplifier section-receiver section Another object is to provide a preamp section and receiver section capable of feeding power and information signals over a two conductor coaxial towing cable.

Still another object is to provide a preampreceiver circuit designed to overcome the problems associated with capacitance reactance in long length towing cables.

Still another is to provide a preampreceiver circuit designed to reduce the problems associated with short circuits or damage to the towing cable.

These and other objects will become more readily apparent from the ensuing description when taken together with the drawings.

BRIEF DESCRIPTION OF THE DRAWINGS

The drawing shows a schematic representation of the invention.

DESCRIPTION OF THE PREFERRED EMBODIMENT

Referring now to the drawing, an acoustically excited transducer Y1 has its output signal coupled to the gate of an input field effect transistor (FET) Q1 through a input protection current limiting resistor R3. The FET Q1 functions as a common source stage and a transistor Q2 operates as a common emitter stage. These two stages form a two stage ac cascade amplifier. An output signal at the ac bypassed emitter of Q2 consists of an ac signal modulated current component in the fixed potential, +10.6 volt supply, which powers the preamplifier circuit.

In the instant circuit a 2N3822 input FET was chosen on the basis of low noise, suitable typical characteristics, and availability. It is dc biased with a 0.47 milliamps constant current diode, CR1, making the input stage independent from the $V_{gs}$ spread and thermal variations. The source terminal of FET Q1 is bypassed for amplification above a lower bandwidth limit established by a capacitor C1 in series with capacitor C2 and the parallel combination of resistors R6 and R7.

The drain current of FET Q1 established by the constant current diode CR1 flows through resistor R4 and develops the input dc potential for the current amplifier stage Q2. Resistor R5 established the emitter current of Q2.

The preamplifier output signal current variations are obtained from the emitter of Q2, bypassed by C3. The output current variations are also collector current coupled back to the input stage where they develop a negative feedback voltage across resistor R6 in parallel with resistor R7 to stabilize the AC gain of the preamplifier. Capacitors C1 and C2 and resistors R7 and R2 form a low frequency rolloff network to attenuate spurious inputs below a minimum operating frequency. This lowest operating frequency is established by an equivalent input RC circuit governed by the total equivalent source capacitance made up of the transducer capacitance plus all stray capacitance to the input node A in conjunction with the input shunt resistor R1 in parallel with the actively controlled resistor R2.

Resistor R2 is effectively bootstrapped to the in-phase negative feedback signal generated across resistor R7 which multiplies its resistance within the preamp bandwidth.

The gate of the input FET Q1 is protected from potentially damaging input signals by the emitter-base junction of Q3. This junction acts as a low leakage, low capacitance zener diode with the zener breakdown occurring between 9 and 12 volts. It is bootstrapped to a positive 2.3 potential across register R6, which reverse biases the junction, nullifies the effects of junction capacitance, and prevents premature forward bias clipping of positive input signal excursions.

When the instantaneous positive input signal exceeds the capability of the feedback to follow this signal, Q3 and gate-source FET junctions become forward biased clipping the positive input excursion at approximately 2 to 3 volts. During a negative input overdrive excursion, the FET gate-source junction remains reverse biased, but the zener breakdown in Q3 clips the input excursion at approximately −7 volts. The input current and power dissipation during input clipping are limited by resistor R3 making the entire input circuit highly immune to damage from mechanical or acoustic excitation levels which may be potentially hazardous to the fragile ceramic element itself.

The output of the preamp appears as a high impedance current sink, whose dc current is modulated by the input signal from the ceramic element. Output signal current variations from the preamp are coupled via the interconnecting coaxial towing cable to the emitter of a compound common base amplifier (current to voltage converter) including transistors Q4 and Q5. Since the input impedance of this circuit is very low it swamps out any shunting effects of cable capacitances allowing the use of very long cables without high frequency response degradation. Transistor Q4 is dc biased by resistor R11 and R12 to deliver the +10.6V operating potential for the preamp section. Its current, as well as the dc current drawn by the preamp flows through resistor R10 connected to the +15 volt supply which powers the circuits. In case of a short in a damaged cable, the common based amplifier Q4 and Q5 cut off and diode CR2 will clamp the short circuit reverse bias applied to Q4 and prevent possible emitter base breakdown in Q4. The maximum short circuit current is limited by resistor R10 in parallel with resistor R11 to approximately 25 milliamps.

Signal current variations in the common base amplifier Q4-Q5 are converted to a voltage signal across a load resistor R8. Capacitor C4 shunts resistor R8 and improves the stability of the circuit by reducing the high frequency voltage amplification of the common base amplifier whose emitter is shunted by the cable capacitance. Capacitor C5 is a dc blocking capacitor as required for interfacing with the following circuitry.

Obviously, many modifications and variations are possible in the light of the above teachings, and, it is therefore understood the invention may be practiced otherwise than as specifically described

What is claimed is:

1. A circuit for transmitting signals generated by a transducer that are representative of acoustic energy comprising:
   means for amplifying the transducer signals and converting them to current modulations, the amplifying means including a direct coupled two stage alternating current amplifier with negative voltage feedback to stabilize the alternating current and a low frequency rolloff network to attenuate spurious inputs;
   the two stage alternating current amplifier having a constant current biased field effect transistor which has a voltage clipping element coupled across the gate-source junction to effect negative polarity clipping;
   means connected to the amplifying means for supplying power to, conducting the current modulated signal from, and towing the amplifying means and transducer, the towing means including a two conductor coaxial cable having a long length approaching 100 feet;
   means coupled to the amplifying and towing means for converting the current modulated components of the amplifying means into voltage signals not affected by the reactive components of the long coaxial cable,
   the amplifying means being coupled to translate the transducer voltage signals into responsive current variations which are fed via the towing means to a current to voltage converter; and
   means coupled across a portion of the current to voltage converter for preventing damaging potentials from being impressed thereacross which could be caused by a short circuit within the transmitting and towing means.

* * * * *